United States Patent
Fujita (10) Patent No.: US 8,129,061 B2
(45) Date of Patent: Mar. 6, 2012

(54) COOLING DEVICE AND COOLING METHOD FOR FUEL CELL

(75) Inventor: Nobuo Fujita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1316 days.

(21) Appl. No.: 10/585,572

(22) PCT Filed: Mar. 3, 2005

(86) PCT No.: PCT/JP2005/004147
§ 371 (c)(1),
(2), (4) Date: Jul. 10, 2006

(87) PCT Pub. No.: WO2005/086268
PCT Pub. Date: Sep. 15, 2005

(65) Prior Publication Data
US 2008/0032168 A1    Feb. 7, 2008

(30) Foreign Application Priority Data
Mar. 10, 2004   (JP) .................. 2004-067981

(51) Int. Cl.
*H01M 8/04* (2006.01)
(52) U.S. Cl. ......... 429/437; 429/428; 429/430; 429/442
(58) Field of Classification Search .................. 429/437, 429/428, 430, 442
See application file for complete search history.

(56) References Cited

U.S. PATENT DOCUMENTS

| 2002/0106543 A1 | 8/2002 | Sonntag et al. |
| 2004/0086757 A1* | 5/2004 | Mohapatra ..................... 429/26 |

FOREIGN PATENT DOCUMENTS

| DE | 100 37 416 A1 | 2/2001 |
| JP | A 2002-216817 | 8/2002 |
| JP | A 2002-319426 | 10/2002 |
| JP | A-2003-36869 | 2/2003 |
| JP | A 2003-123804 | 4/2003 |
| JP | A 2003-123813 | 4/2003 |
| JP | A 2003-346845 | 12/2003 |
| JP | A 2004-14484 | 1/2004 |

OTHER PUBLICATIONS

Reichart; "Leitfähigkeit;" Stolberg; Mar. 2000.

* cited by examiner

*Primary Examiner* — Jane Rhee
(74) *Attorney, Agent, or Firm* — Oliff & Berridge, PLC (57) ABSTRACT

A cooling device for a fuel cell is provided which can maintain the electric conductivity of a liquid coolant within the predetermined range even if a load suddenly changes. In the cooling device for a fuel cell (10), the parameters ($T_H$, $T_L$) relating to the coolant temperature can be controlled so that the electric conductivity (S) at a target set temperature is maintained within a target electric conductivity range ($S_{max}$-$S_{min}$) based on the correlation between the parameters relating to the coolant temperature and the electric conductivity of the coolant. Because the electric conductivity is feed-forward controlled based on the correlation between the parameters relating to the coolant temperature and the electric conductivity of the coolant, the electric conductivity of the coolant can be reliably maintained within the target range even when electric conductivity with a comparatively poor responsiveness is controlled.

13 Claims, 7 Drawing Sheets

COOLING DEVICE AND COOLING METHOD FOR FUEL CELL

TECHNICAL FIELD

The present invention relates to a device for cooling a fuel cell system, and more particularly to a cooling device for estimating electric conductivity and controlling the temperature of liquid coolant.

BACKGROUND ART

Cooling devices with a circulating liquid coolant have been used to remove the heat generated in fuel cells in the fuel cell systems installed on movable objects such as electric automobiles.

For example, Japanese Patent Application Laid-open No. 2002-216817 disclosed such cooling device which decreases the liquid coolant bypass ratio to an electric conductivity reduction device (ion-exchange resin) when the temperature of the liquid coolant is high and electric conductivity is low, and increases the bypass ratio to the electric conductivity reduction device when the temperature of the liquid coolant is low and electric conductivity is high. With such technology, at a high temperature when high cooling performance is required, the bypass flow rate can be increased and priority can be placed on cooling, and at a low temperature when the amount of emitted heat is small, priority can be placed on reducing electric conductivity of liquid coolant.

Similar technology is also described in Japanese Patent Applications Laid-open No. 2003-123804 and 2003-123813.

DISCLOSURE OF INVENTION

The applicant of the present application has experimentally discovered that the electric conductivity of a liquid coolant not only rises as the liquid coolant is used, but also correlates with the temperature at which the liquid coolant is used. Thus, it was found that the electric conductivity of a liquid coolant tends to increase with the temperature thereof. With the above-described conventional technology, such increase in electric conductivity accompanying the increase in temperature of liquid coolant is not taken into account. Therefore, if the ratio of a liquid coolant passing through the electric conductivity decreasing device at a high temperature is small, the electric conductivity eventually can exceed the allowed limit.

Accordingly, it is an object of the present invention to provide a device for cooling a fuel cell that can maintain the electric conductivity of a liquid coolant within the predetermined range even if the temperature of the liquid coolant changes following the change in the operation state of the fuel cell.

In order to attain this object, the present invention provides a cooling device that adjusts a temperature of a fuel cell to a target set temperature by supplying a coolant, wherein a parameter related to the coolant temperature can be controlled so as to maintain an electric conductivity at the target set temperature within a target electric conductivity range based on the correlation between the parameter related to the coolant temperature and the electric conductivity of the coolant.

It was found that coolants usually have a certain correlation between the temperature and electric conductivity, such that the electric conductivity increases with temperature. With the above-described configuration, the parameter related to the coolant temperature is controlled based on the correlation of the parameter related to the coolant temperature and the electric conductivity of the coolant that is specified based on the facts discovered by the applicant. Therefore, the electric conductivity determined correspondingly to the coolant temperature can be adjusted to and maintained within the target electric conductivity range.

Here, the "parameter related to the coolant temperature" is at least one element selected from the group including the temperature of the coolant, a cooling degree of the coolant, a required output of the fuel cell, an operation state of the fuel cell, and an external air temperature. Thus, the parameter is an element that directly or indirectly influences the coolant temperature. For example, if the cooling degree of the coolant intensifies, the coolant temperature decreases, and if the cooling degree is weakened, the coolant temperature rises. If the required output of the fuel cell increases, the coolant temperature rises due to heat generation accompanying the electrochemical reaction, but if the required output of the fuel cell decreases, the heat generation is also decreased and the coolant temperature drops. If the operation state of the fuel cell is a high-load mode, the amount of heat of the coolant increases, and if the fuel cell operates in a low-load mode, the amount of heat of the coolant decreases. If the external air temperature is high, the coolant temperature increases, and if the external air temperature is low, the coolant temperature decreases.

Here, "the control of the parameter related to the coolant temperature" can be achieved with coolant supply state change means for changing the supply state of the coolant supplied to the fuel cell. Here, the supply state of the coolant includes the coolant temperature before the coolant is supplied to the fuel cell, this coolant temperature being decreased by an external cooling device (radiator), or the amount of coolant (pressure or flow rate) supplied to the fuel cell.

The increase in the coolant temperature is inhibited by changing the supply state of the coolant to the fuel cell (preferably, by reducing the temperature of the supplied coolant or increasing the amount of supplied coolant) when the electric conductivity of the coolant exceeds or is supposed to exceed the range of the target electric conductivity ratio. As a result, the electric conductivity is maintained within the target electric conductivity range.

Furthermore, "the control of the parameter related to the coolant temperature" can be achieved with operation state changing means for changing the operation state of the fuel cell. The operation state as referred to herein, for example, includes an output (quantity of generated power, electric power) of the fuel cell, quantity of supplied fuel gas and oxidizing gas (pressure or flow rate), and a target set temperature as an operation temperature of the fuel cell.

The increase in coolant temperature is inhibited by changing the operation state of the fuel cell when the electric conductivity of the coolant exceeded or is supposed to exceed the target electric conductivity range (preferably, the operation state is restricted, and even more preferably the operation is stopped). As a result, the electric conductivity is maintained within the target electric conductivity range.

Furthermore, the coolant temperature is here controlled by changing at least one of the cooling degree of the coolant and the operation state of the fuel cell. The coolant temperature is directly influenced by the cooling degree of the coolant and the operation state of the fuel cell. Therefore, if a control is implemented by changing the cooling degree of the coolant or changing the operation state of the fuel cell, the coolant temperature, that is, the electric conductivity can be maintained within the estimated range.

For example, it is preferred that the cooling device further comprise electric conductivity decreasing means for decreasing the electric conductivity of the coolant, wherein the parameter related to the coolant temperature is controlled based on the decrease quantity of the electric conductivity with the electric conductivity decreasing means. Generally the decrease in electric conductivity with the electric conductivity decreasing means depends on the amount of coolant that came into contact and passed through the electric conductivity decreasing unit, and if the treatment capacity of the electric conductivity decreasing means is increased, then the change in the electric conductivity caused by the electric conductivity decreasing unit will be large. Therefore, in this case, the electric conductivity at the target set temperature can be estimated by considering the amount of decrease in the electric conductivity caused by the electric conductivity decreasing means and more accurate control electric conductivity is possible.

Here, the "electric conductivity reducing means" is a unit that can decrease electric conductivity by ion exchange between the ionized impurities and hydrogen ions or hydroxide ions; units of various types can be employed, but means having a filter structure using, for example, an ion-exchange resin, is especially easy to use.

More specifically, in accordance with the present invention, the cooling device in accordance with the present invention comprises electric conductivity measuring means for measuring the electric conductivity of the coolant, temperature measuring means for measuring the temperature of the coolant, means for estimating the electric conductivity at the target set temperature based on the electric conductivity of the coolant, the temperature of the coolant, and the correlation of the temperature and electric conductivity of the coolant, and means for decreasing the target set temperature when the electric conductivity at the target set temperature exceeds the target electric conductivity range.

Because conventionally the coolant temperature is not controlled, if the electric conductivity temporarily increases following the increase in coolant temperature, then the decrease in electric conductivity with the electric conductivity decreasing means or the cooling by the coolant fails and a high electric conductivity is assumed. On the other hand, the temperature assumed by the coolant after the warm-up can be estimated to a certain degree for each system. With the above-described configuration, if the electric conductivity and coolant temperature at a certain point in time are measured and the results are fit into the correlation, then the electric conductivity of the coolant at any temperature can be estimated. Therefore, when the electric conductivity at a certain target set temperature exceeds the target electric conductivity range, then changing the target set temperature so that the electric conductivity enters the range prevents the electric conductivity from being abnormally high. Thus, because the coolant temperature after the warm-up is controlled as an target set temperature, and the electric conductivity at the target set temperature is evaluated in advance by using the correlation between the electric conductivity of the coolant and a parameter influencing the coolant temperature, and the parameter related to the temperature is adjusted so that the estimated electric conductivity becomes within the target electric conductivity range, the electric conductivity at the target set temperature can be controlled so as to be held within the appropriate range (feed-forward control).

On the other hand, means for increasing the target set temperature of the coolant within a range such that the electric conductivity at the target set temperature does not exceed the target electric conductivity range also may be provided. From the standpoint of system operation, a low coolant temperature is not necessarily good and in many cases it is preferred that the coolant temperature be set within a trouble-free range. For example, the lower is the electric conductivity of the coolant the better, but in order to shorten the start time of the fuel cell or maximize the power generation efficiency, the coolant temperature has to be rather high. For this reason, it is sometimes preferred that the temperature be raised within a range in which the electric conductivity of the coolant does not exceed the target electric conductivity range.

BEST MODE FOR CARRYING OUT THE INVENTION

The preferred mode for carrying out the invention will be described hereinbelow with reference to the appended drawings. In the below-described embodiments, the cooling apparatus in accordance with the present invention is applied to a fuel cell system installed on a movable object such as an electric automobile. Those embodiments are merely illustrating examples, and the present invention is not limited to the scope thereof.

Embodiment 1

Figure 1:
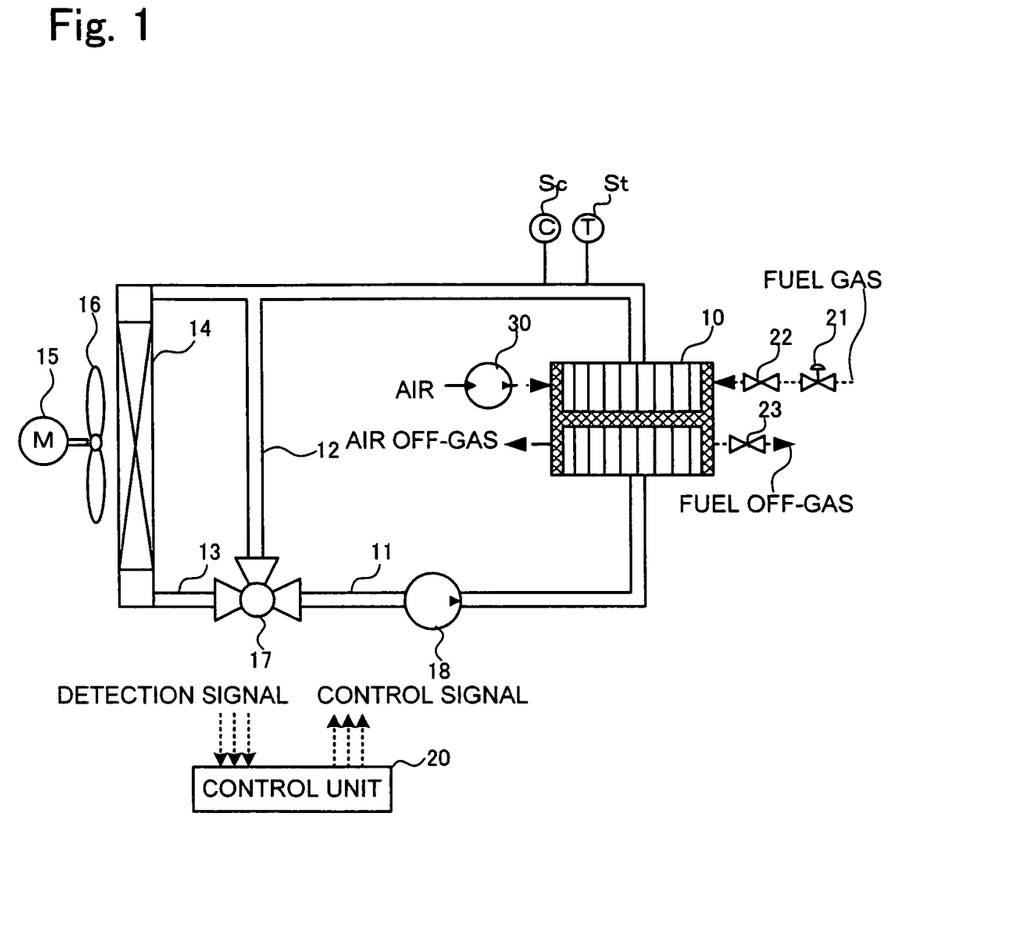
FIG. 1 is a block diagram of the fuel cell system of Embodiment 1.

Embodiment 1 of the present invention relates to cooling control in the case where direct decrease in the electric conductivity by electric conductivity decreasing device is not taken into account. FIG. 1 shows the entire configuration of the present fuel cell system. As shown in FIG. 1, in the fuel cell system, a circulation channel 11 of a liquid coolant is provided so that the liquid coolant can be circulated inside a fuel cell stack 10. The circulation channel 11 is divided into a bypass channel 12 and a cooling channel 13 where a radiator 14 is provided. The circulation channel is configured so that the bypass channel 12 and cooling channel 13 can be selected by a three-way valve 17. A liquid coolant pump 18 that is driven at a revolution speed based on a control signal from a control unit 20 is provided in the circulation channel 11, thereby enabling forced circulation of the liquid coolant. A thermometer St for detecting the temperature of the liquid coolant and an electric conductivity meter Sc for detecting the electric conductivity of the liquid coolant are provided in the outlet opening of the fuel cell stack 10.

In the fuel cell stack 10, a plurality of unit cells are stacked, thereby enabling the generation of a high voltage. In each unit cell, a MEA (Membrane Electrode Assembly) structure, in which a polymer electrolyte electrode is sandwiched between two electrodes (a fuel electrode and an air electrode), is sandwiched between separators with good gas permeability. In the fuel electrode, a catalyst layer for the fuel electrode is provided on a porous support layer, and in the air electrode, a catalyst layer for the air electrode is provided on the porous support layer. Because the fuel cell stack 10 generates heat by an electrochemical reaction accompanying power generation, the stack is maintained within an appropriate temperature range with a liquid coolant.

A system for supplying hydrogen gas, which is a fuel gas, to the fuel cell stack 10 comprises a pressure adjustment valve 21 for adjusting the pressure of the hydrogen gas supplied from a fuel gas supply source (high-pressure tank, reformer, hydrogen storage alloy tank, etc.) that is not shown in the figure and maintaining the hydrogen gas at the predetermined pressure, a fuel cell inlet opening shutoff valve 22 for interrupting the supply of the hydrogen gas into the fuel cell stack 10, and a fuel cell outlet opening shutoff valve 23 for interrupting the discharge of hydrogen off-gas from the fuel cell stack 10. The fuel off-gas released from the fuel cell outlet opening shutoff valve 23 is diluted with the air supplied by a diluting device (not shown in the figures) and discharged.

Furthermore, in the system for supplying the air, which is an oxidizing gas, into the fuel cell stack 10, the compressed air is supplied from the air inlet port (not shown in the figure) by a compressor 30, used for the electrochemical reaction, and discharged as an air off-gas.

Valves and pumps of the system for supplying the hydrogen gas and the system for supplying the air can be driven based on control signals from the control unit 20.

Figure 3:
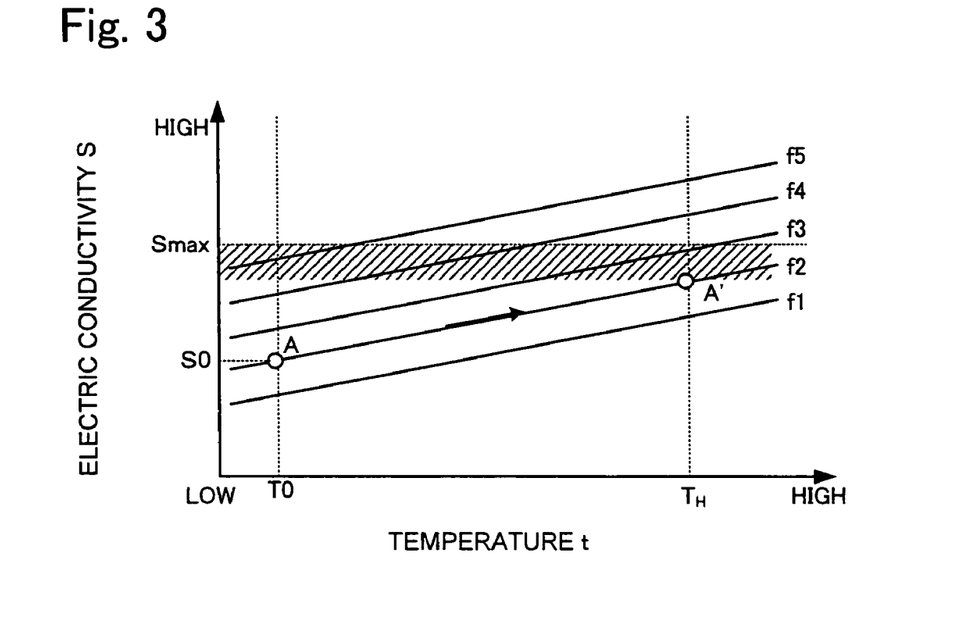
FIG. 3 is a control characteristic diagram of the liquid coolant temperature and electric conductivity in the case where the electric conductivity is low even after the warm-up.
Figure 4:
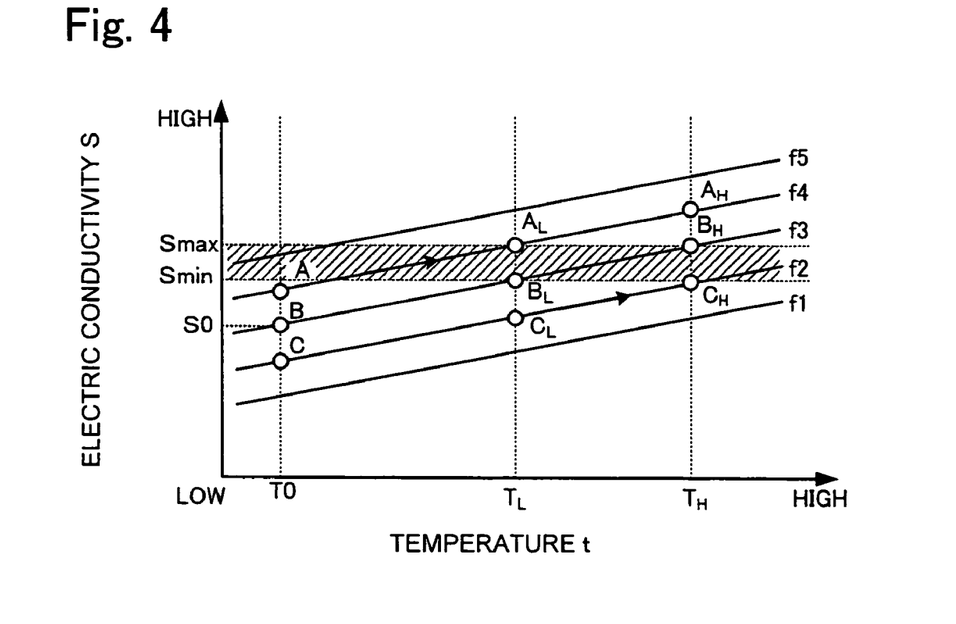
FIG. 4 is a control characteristic diagram of the liquid coolant temperature and electric conductivity illustrating the control using the target electric conductivity range of Embodiment 1.

The control unit 20 is a well-known computer system of general utility for automobile control such as ECU (Electronic Control Unit) that comprises a central processing unit (CPU), which is not shown in the figure, a RAM, a ROM, etc., and can operate the fuel cell system as a cooling apparatus in accordance with the present invention by executing a computer program stored in the ROM, etc. A specific feature of the control unit 20 is that it stores inside thereof the correlation between the temperature and electric conductivity of the liquid coolant as a data table such as shown in FIG. 3 or FIG. 4. Because this correlation is a linear relationship, it may be stored in the relational expression format. If the control unit 20 judges the temperature and electric conductivity of the liquid coolant at a certain point in time, then the control unit can estimate the electric conductivity by referring to the aforementioned correlation when the temperature of the liquid coolant thereafter changes. As shown in FIG. 3 and FIG. 4, one point is set if the electric conductivity and temperature at a certain point in time are determined, and the electric conductivity changes linearly with the increase in temperature from this point. If the initial electric conductivity is high, subsequent electric conductivity rises therefrom with the increase in temperature. If the initial electric conductivity is low, it rises from this low position and the rise ratio (variation coefficient) is the same, regardless of the value of the initial electric conductivity.

Furthermore, the correlation between the temperature and electric conductivity of the liquid coolant that is shown in FIG. 3 and FIG. 4 is merely a simple example, and the correlation can differ depending on a variety of factors. Therefore, such correlation is preferably found by actual measurements for each fuel cell system.

In the above-described structure, the fuel cell stack 10 generates power when hydrogen gas is supplied to the fuel electrode side of the fuel cell stack 10 and the air is supplied to the air electrode side. In order to remove heat accompanying power generation, the control unit 20 drives the liquid coolant pump 18, circulates the liquid coolant inside the circulation channel 11, and cools the interior of the fuel cell stack 10. The control unit 20 recognizes the liquid coolant temperature by referring to a detection signal from the thermometer St. When cooling is not required, e.g., when the fuel cell stack is started, the three-way valve 17 is switched to the bypass channel 12 to circulate the liquid coolant, but if the temperature of the fuel cell stack 10 rises and cooling becomes necessary, the control unit 20 outputs a control signal for driving the motor 15, the fan 16 is rotated, air cooling of the liquid coolant with radiator 14 is performed, and the liquid coolant temperature is reduced.

Furthermore, the cooling liquid flowing in the coolant system is pure water or an antifreeze containing a dissolved substance (ethylene glycol etc.) that decreases the freezing point. Ions generated in the fuel cell stack are dissolved in the solvent of the liquid coolant or piping materials leach out into the solvent, and even in the case of pure water a slight amount of ions is contained therein, thereby providing for slight electric conductivity.

FIG. 3 shows the correlation diagram between the electric conductivity and temperature in the liquid coolant. As shown in FIG. 3, because the action of ion molecules is activated proportionally to temperature, the electric conductivity of the liquid coolant rises with the increase in temperature. In fuel cells, the liquid coolant is used to dissipate heat, and if the electric conductivity of the liquid coolant rises, short circuit, decrease in generated power, and drop in generated voltage are induced. For this reason, the electric conductivity of the fuel cell has to be retained below a certain level.

However, the electric conductivity of the liquid coolant correlates with temperature, and when the liquid coolant temperature rises, the liquid coolant temperature cannot be immediately decreased. For this reason, the electric conductivity also cannot be decreased. Furthermore, even if the electric conductivity decreasing device is used, the electric conductivity cannot be rapidly lowered. For this reason, when the load suddenly increases and the liquid coolant temperature rapidly rises, the electric conductivity can exceed the allowed range. Furthermore, if the electric conductivity of the liquid coolant becomes too high, short circuit can occur inside the fuel cell, the amount generated power can drop, and power generation can stop. For this reason it is preferred that the electric conductivity of the liquid coolant be maintained within the allowed range. Accordingly, in the present embodiment, the electric conductivity is maintained within the predetermined range by the below-described processing.

Figure 2:
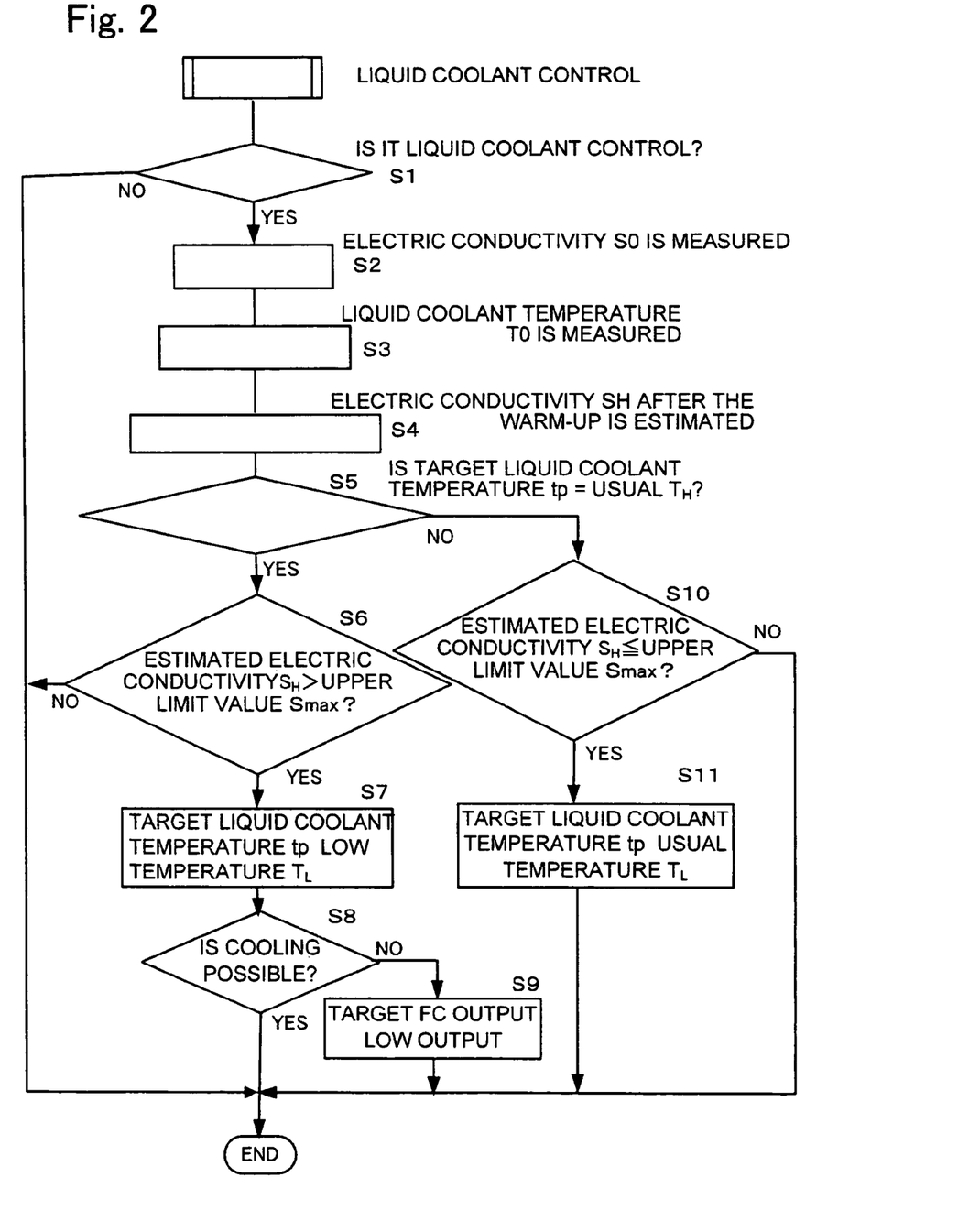
FIG. 2 is a flowchart illustrating the operation of the cooling apparatus of Embodiment 1.

The processing in the cooling apparatus of the fuel cell system of Embodiment 1 will be explained below with reference to the flowchart shown in FIG. 2 and the correlation between the temperature and electric conductivity of the liquid coolant shown in FIG. 4. Because of slow changes, the temperature control of the liquid coolant may not be conducted as rapidly as other processing. Therefore, priority is placed on other processing before the temperature control timing (S1: NO).

In the correlation diagram shown in FIG. 4, the zone between the electric conductivities $S_{max}$-$S_{min}$ shown by inclined lines is a target electric conductivity range in which the electric conductivity is preferably held by a feed-forward control. In the below-described operation, the electric conductivity and temperature of the liquid coolant are measured as the system is started (time $T_0$) and the future electric conductivity is controlled, but this control is not limited to the start and can be implemented during restart of intermittent operation or at other appropriate timing. A specific feature of this control is that the liquid coolant temperature is controlled from the electric conductivity and temperature at a certain point in time so as to fit the future electric conductivity into a fixed range. The control unit 20 can set the target temperature of the liquid coolant, but in the present embodiment the temperature $T_H$ after the warm-up in the usual operation is taken as a standard target temperature including the initial state, and lower target temperature $T_L$ is reset according to the value of the electric conductivity during the warm-up.

Once the timing for temperature control of liquid coolant is ready (S1: YES), the control unit 20 reads a detection signal from the electric conductivity meter Sc and measures the electric conductivity $S_0$ at the present point in time (S2). At the same time, a detection signal from the thermometer St is also read and the temperature $T_0$ is also measured (S3). Then, the control unit 20 estimates the electric conductivity $S_H$ after the warm-up from the electric conductivity $S_0$ and temperature $T_0$ at the present point in time (S4). In the fuel cell systems such as installed on electric automobiles, the liquid coolant temperature rises from the start time due to electrochemical reactions proceeding in the fuel cell, but if the load (traveling mode) of the fuel cell is constant, then there is a temperature at which a balance is attained of the cooling by the cooling system and heat generation by the fuel cell, and the change in temperature slows down as this temperature is approached. Which temperature is attained by the fuel cell is determined by the specifications of each system, but the approximate equilibrium temperature of the liquid coolant can be estimated from the required load of the fuel cell at the present point in time, the amount of load in the usual traveling mode, or statistically derived estimated load quantity. The control unit 20 derives the electric conductivity $S_H$ at the temperature $T_H$ after the warm-up based on the table or computational formula representing the correlation, such as shown in FIG. 4, by taking this equilibrium temperature as the temperature $T_H$ after the warm-up.

As shown in FIG. 3, if the fuel cell system is operated as is by the usual temperature control when the electric conductivity at the temperature T0 at the present point in time is S0 and corresponds to the position represented by point A in the correlation diagram shown in FIG. 3, then the electric conductivity rises along this straight line and reaches the position of point A' at the temperature TH after the warm-up. No problem is encountered when the electric conductivity in the point A' is equal to or less than (point A') the upper limit $S_{max}$ of the appropriate electric conductivity range, as shown by the correlation diagram in FIG. 3. However, as shown in the correlation diagram in FIG. 4, when the electric conductivity AH at the temperature $T_H$ after the warm-up exceeds the upper limit $S_{max}$ of the target electric conductivity range represented by inclined lines due to the increase in the electric conductivity $S_0$ in the point A, which is the start point, the electric conductivity has to be decreased.

Accordingly, the control unit 20 changes the target liquid coolant temperature after the warm-up to $T_L$ (S7) when the target liquid coolant temperature becomes the usually set temperature $T_H$ (S5: YES) and the electric conductivity $S_H$ estimated from the correlation diagram exceeds the upper limit value $S_{max}$ (YES).

As follows from FIG. 4, at the target liquid coolant temperature $T_L$, even if the electric conductivity changes from the point A, the electric conductivity $A_L$ is equal to or less than the upper limit value $S_{max}$ of the target electric conductivity range. Therefore, the electric conductivity can be appropriately controlled if the rise in the temperature of the liquid coolant can be suppressed to the target liquid coolant temperature $T_L$.

Here, the liquid coolant temperature is determined by several factors. One of them is the required output of the fuel cell stack 10. If the output of the fuel cell increases, the generation of heat accompanying the electrochemical reaction intensifies and the liquid coolant temperature further increases. Furthermore, the operation state of the entire fuel cell system is also a factor. If the load necessary for the system increases, the liquid coolant temperature also easily rises. The external air temperature directly affects the air cooling intensity. If the external air temperature rises, the liquid coolant temperature also easily rises.

Furthermore, the elements enabling the forced control by the control unit 20 of the liquid coolant temperature that varies depending on the aforementioned factors include the cooling intensity control in the radiator 14, the flow rate control of the liquid coolant in the liquid coolant pump 18, and the suppression control of power generation output in the fuel cell stack 10. The control unit 20 maintains the liquid coolant temperature within the target temperature range by using those control elements individually or in combination thereof.

Once the target liquid coolant temperature has been set at a low temperature, the cooling intensity by the liquid coolant has to be raised within the range allowed by cooling capacity. Accordingly, the control unit 20 switches the three-way valve 17 to the cooling channel 13, thereby switching to natural air cooling with the air flowing through the radiator 14. When the natural air cooling is insufficient, the control unit 20 supplies a control signal to the motor 15, the fan 16 is rotated, and the intensity of air cooling with the radiator 13 is increased. When the temperature of the external air is high and the cooling intensity provided by the usual fan rotation is insufficient, e.g., as in summer, the control unit 20 supplies a control signal for increasing the revolution speed to the motor 15, the fan 16 is rotated at a higher speed, and the intensity of air cooling is increased. Furthermore, the control unit 20 also sets the revolution speed corresponding to the required cooling intensity for the liquid coolant pump 18.

In the usual required cooling intensity range, the liquid coolant can be maintained at the target set temperature $T_L$ by any of the above-described cooling control types, but when the external air temperature further rises, the cooling lags behind, and the liquid coolant temperature sometimes exceeds the target set temperature $T_L$. Accordingly, when the cooling with the liquid coolant is judged to be insufficient (S8: NO) based on the parameters relating to temperature even when the cooling capacity of the system is used at a maximum limit, the control unit 20 resets the required output value itself, which has been set in the fuel cell stack 10, to a lower output (S9). This low output can be realized, for example, by decreasing the pressure adjusted with the pressure adjusting valve 21, temporarily closing the shutoff valves 22 and 23, or decreasing the drive quantity of the compressor 30.

If the liquid coolant temperature can be maintained at $T_L$ by the above-described control, then the electric conductivity SL at the low temperature setting also can be fit in the target electric conductivity range.

On the other hand, it is sometimes preferred that the liquid coolant temperature be on a somewhat higher side. For this reason, it is more preferred to set the liquid coolant temperature high within a range where the upper limit value $S_{max}$ of the electric conductivity is not exceeded. Accordingly, when the target set temperature of the liquid coolant is set to a low temperature $T_L$ (S5: NO) and the electric conductivity $S_H$ is equal to or less than the upper limit value $S_{max}$ even at the usual set temperature $T_H$ of the liquid coolant (S10: YES), the control unit 20 returns the target liquid coolant temperature, which has been set low, to the usual temperature $T_H$ (S11).

For example, in the case of position C at the time of start, as shown in FIG. 4, the electric conductivity (position $C_L$) at a low liquid coolant temperature $T_L$ is obviously equal to or less than the upper limit value $S_{max}$, but it is also equal to or less than the upper limit value $S_{max}$ even at the usual temperature $T_H$ (position $C_H$). As a result, the liquid coolant temperature becomes too low. In such a case, the target set temperature of the liquid coolant has to be returned to $T_H$.

In order to raise again the liquid coolant temperature, for example, the control unit 20 can decrease the revolution speed of the fan 16, or stop the rotation and switch to the natural air cooling, or switch the three-way valve 17 to the bypass channel 12 and stop cooling with the radiator 14. Another option is to reduce the revolution speed of the liquid coolant pump 18.

With the cooling process of the Embodiment 1 described hereinabove, the electric conductivity at the temperature after the warm-up will eventually be maintained within the range of target electric conductivity (inclined lines in FIG. 4) set by the inclination of straight lines representing the correlation.

In other words, when the electric conductivity $S_H$ at the target set temperature exceeds the target electric conductivity range, the control is conducted so that the target set temperature is changed to fit the electric conductivity into the range and so that the cooling intensity is raised. Therefore, the abnormal increase in electric conductivity is prevented.

Furthermore, when the electric conductivity at the target set temperature is below the target electric conductivity range, the control is conducted so as to raise the target set temperature of the liquid coolant. Therefore, appropriate system operation can be maintained.

Embodiment 2

Figure 5:
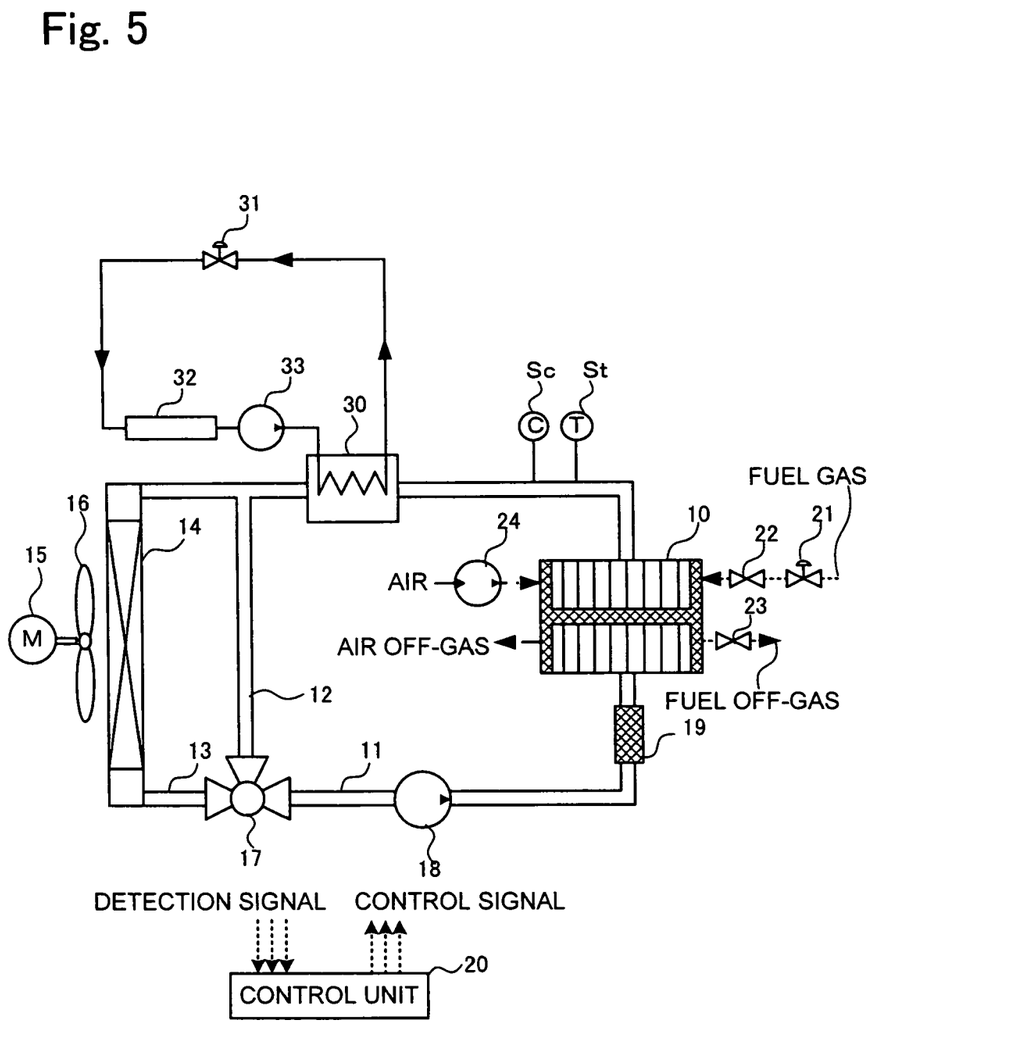
FIG. 5 is a block diagram of the fuel cell system of Embodiment 2.

Embodiment 2 of the present invention, by contrast with Embodiment 1, relates to a cooling control which employs an electric conductivity decreasing device and takes the direct decrease in electric conductivity into account. FIG. 5 illustrates the entire configuration of the present fuel cell system. As shown in FIG. 5, in this fuel cell system, an ion exchanger 19, which is equivalent to the electric conductivity decreasing device in accordance with the present invention, is provided in the circulation channel 11 of a liquid coolant in Embodiment 1. Furthermore, a heat exchanger 30 is provided in the circulation channel 11, and a secondary cooling device serving to conduct heat exchange via this heat exchanger with the liquid coolant flowing through the circulation channel 11, which is a primary channel, is provided. The secondary cooling device comprises a pressure adjusting valve 31, a condenser 32, and a circulation pump 33 and is so configured that heat can be taken by the heat exchanger 30 away from the liquid coolant flowing through the circulation channel 11, thereby decreasing the temperature of the liquid coolant. Other aspects of the structure are identical to those of Embodiment 1.

In the ion exchanger 19, a housing forming a channel is filled with an ion-exchange resin in the form of spheres or fibers with a large surface area. The ion-exchange resin is a synthetic resin composed of a cation-exchange resin and an anion-exchange resin and is provided with functional groups. The cations are adsorbed by the cation-exchange resin, and the anions are adsorbed by the anion-exchange resin. Ions are removed when the liquid coolant passes through the ion exchanger 19, and the electric conductivity of the liquid coolant is decreased. On the other hand, because the liquid coolant passes through the space filled with the ion-exchange resin, a pressure loss occurs in the ion exchanger 19, and a large quantity of liquid coolant can hardly be circulated. For this reason, in the present embodiment, the secondary cooling device using the heat exchanger 30 is provided, the liquid coolant temperature is further decreased, and a certain cooling intensity can be maintained even with a small quantity of circulating liquid coolant. Furthermore, because such secondary cooling device is provided, the capacity of the ion exchanger 19 can be increased and the electric conductivity decrease capacity can be increased. Therefore, in the present embodiment, the decrease in electric conductivity caused by the ion exchanger 19 can be also taken into account in the cooling control of the present invention conducted to maintain the electric conductivity.

Furthermore, in addition to using the above-described heat exchanger 30, a bypass channel may be provided parallel to the circulation channel, and an ion exchanger may be disposed in the bypass channel to respond to the pressure drop in the ion exchanger.

Figure 6:
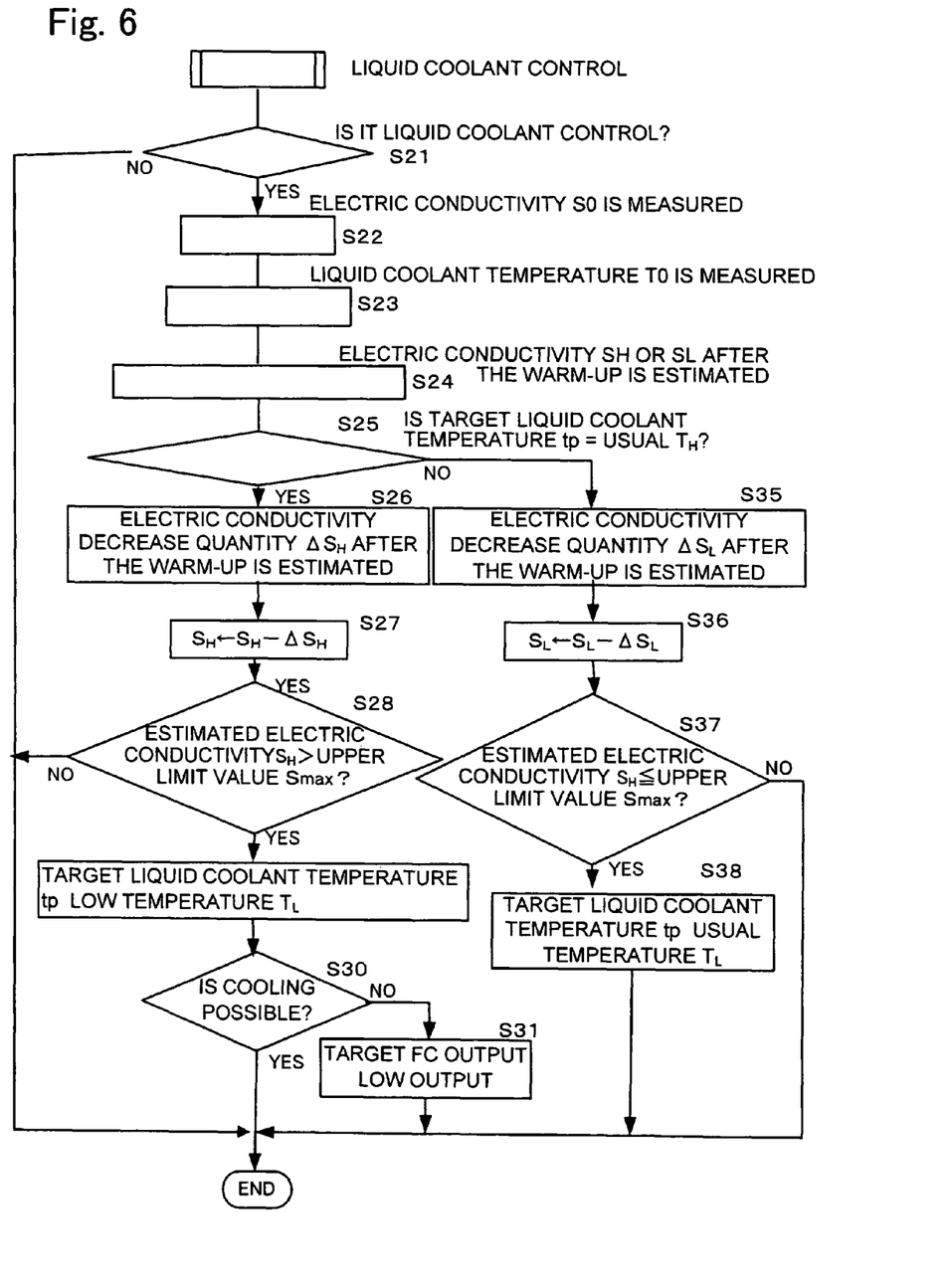
FIG. 6 is a flowchart illustrating the operation of the cooling apparatus of Embodiment 2.

The processing conducted in the device for cooling a fuel cell system in Embodiment 2 will be explained below with reference to the flowchart shown in FIG. 6.

In terms of measuring the electric conductivity $S_0$ and temperature $T_0$ of the liquid coolant during the start or restart in intermittent operation and finding the estimated electric conductivity $S_H$ or $S_L$ at the target set temperature $T_H$ or $T_L$, this embodiment is identical to Embodiment 1 (S21-S24).

In Embodiment 2, an ion exchanger 19 is provided. Therefore, the decrease in electric conductivity of the liquid coolant caused by ion exchange can be expected. The amount of this decrease in electric conductivity is set in relation to the amount of water in the liquid coolant that can flow through the ion exchanger 19, that is, the revolution speed of the liquid coolant pump 18. Because the revolution rate of the liquid coolant pump 18 differs according to the target set temperature of the liquid coolant, the amount of circulating water set by the revolution speed of the liquid coolant pump, and then the electric conductivity decrease amount can be estimated according to whether the target set temperature at the present point in time is the usual temperature $T_H$ or a low temperature $T_L$.

Accordingly, when the present target set temperature is the usual temperature $T_H$ (S25: YES), the control unit 20 estimates the decrease amount $\Delta S_H$ of the electric conductivity after the warm-up correspondingly to the amount of circulating water prior to the usual temperature (S26). Then, the decrease amount $\Delta S_H$ of the electric conductivity caused by the ion exchanger 19 is subtracted from the electric conductivity $S_H$ after the warm-up, which was estimated in step S24, and the result is taken as the electric conductivity $S_H$ after the warm-up (S27).

Furthermore, when the present target set temperature is a low temperature setting $T_L$ (S25: NO), the decrease amount $\Delta S_L$ of the electric conductivity after the warm-up is estimated correspondingly to the amount of circulating water at the low temperature setting $T_L$ (S35). Then, the decrease amount $\Delta S_L$ of the electric conductivity caused by the ion exchanger 19 is subtracted from the electric conductivity $S_L$ after the warm-up, which was estimated in step S24, and the result is taken as the electric conductivity $S_L$ after the warm-up (S36).

The cooling control conducted after the electric conductivity could thus be estimated by taking into account the decrease in electric conductivity in the ion exchanger is almost identical to that of Embodiment 1. Thus, if the estimated $S_H$ exceeds the upper limit value $S_{max}$ (S28: YES), the target set temperature of the liquid coolant changes to the low temperature (S29), and if the cooling capacity catches up, the output is left as is (S30: YES), but if the cooling capacity does not catch up (S30: NO), the output of the fuel cell stack 10 itself is set lower (S31). Furthermore, when the electric conductivity $S_H$ does not exceed the upper limit value $S_{max}$ even at the usual temperature $T_H$ at a low temperature setting (S37: YES), the target set temperature of the liquid coolant returns to the usual temperature $T_H$ (S38).

Figure 7:
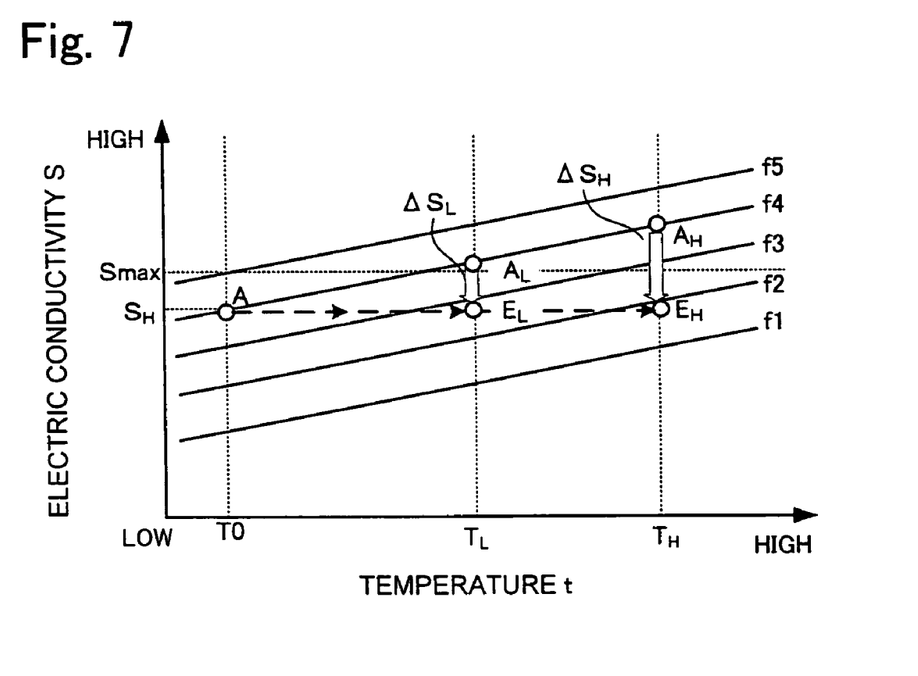
FIG. 7 is a control characteristic diagram of the liquid coolant temperature and electric conductivity in the control which does not change the electric conductivity.

In Embodiment 2, for example, as shown in FIG. 7, the decrease in electric conductivity caused by the ion exchanger 19 is considered. Therefore, if the liquid coolant is at a low temperature setting $T_L$, the electric conductivity $S_L$ after the warm-up decreases by the decrease amount $\Delta S_L$ of the electric conductivity (position $E_L$) by comparison with that when the ion exchanger 19 is absent (position $A_L$). Furthermore, if the liquid coolant is at the usual temperature setting $T_H$, the electric conductivity $S_H$ after the warm-up decreases by the decrease amount $\Delta S_H$ of the electric conductivity (position $E_H$) by comparison with that when the ion exchanger 19 is absent (position $A_H$). For this reason, as shown in FIG. 7, the electric conductivity can be always controlled to a constant value, regardless of the liquid coolant temperature.

Other operation and effect are identical to those of Embodiment 1

Other Embodiments

Figure 9:
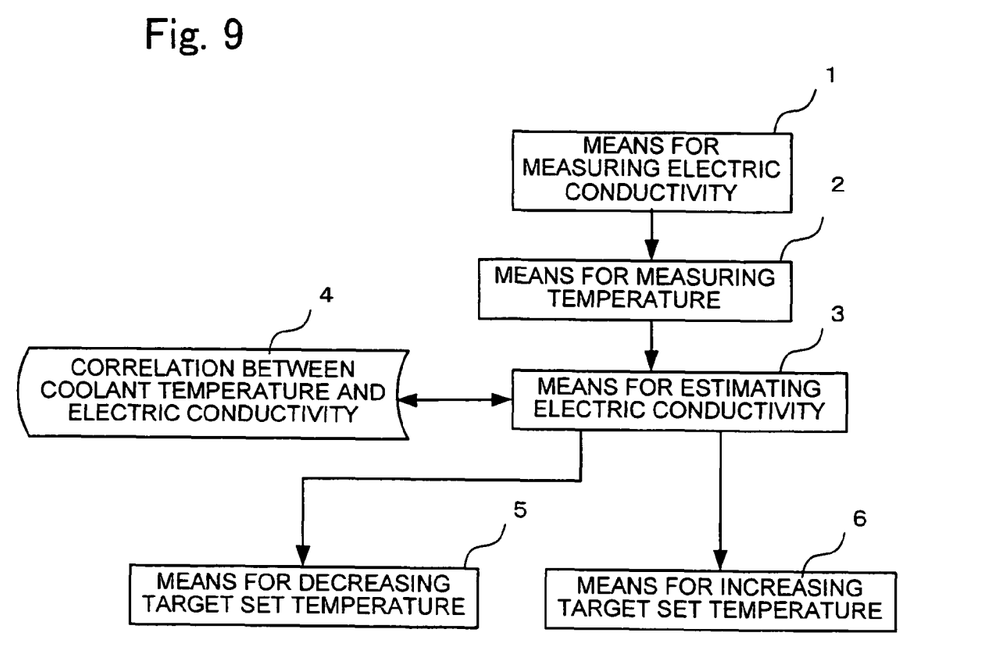
FIG. 9 is a functional block diagram of the present invention.

FIG. 9 shows a functional block diagram of the fuel cell system in accordance with the present invention. The present invention can be modified and employed outside the scope of the above-described embodiments, provided that the below-described functions can be realized in some form.

Thus, as shown in FIG. 9, the apparatus of the present invention comprises as functional blocks an electric conductivity measurement unit 1 for measuring the electric conductivity of a coolant, a temperature measurement unit 2 for measuring the temperature of the coolant, a unit 3 for estimating the electric conductivity at a target set temperature based on the electric conductivity of the coolant, the temperature of the coolant, and a correlation 4 between the temperature and electric conductivity of the coolant that is grasped in some form, and a unit 5 for reducing the target set temperature when the electric conductivity at the target set temperature exceeds the target electric conductivity range. It is further preferred that the apparatus comprises a unit 6 for raising the target set temperature within a range in which the electric conductivity at the target set temperature does not exceed the target electric conductivity range. More specifically, for example, in the above-described embodiments, the control was conducted so that the electric conductivity was maintained within the predetermined range by controlling the target set temperature of the liquid coolant, but the control may be also conducted so as to maintain the electric conductivity after the warm-up in the predetermined range by controlling the decrease ratio of the electric conductivity. Thus, the electric conductivity can be also controlled by setting a target electric conductivity after the warm-up, and controlling, for example, the revolution speed of the liquid coolant pump 18 so that the ion exchanger 19 is caused to remove ions so as to obtain the electric conductivity that was set.

Figure 8:
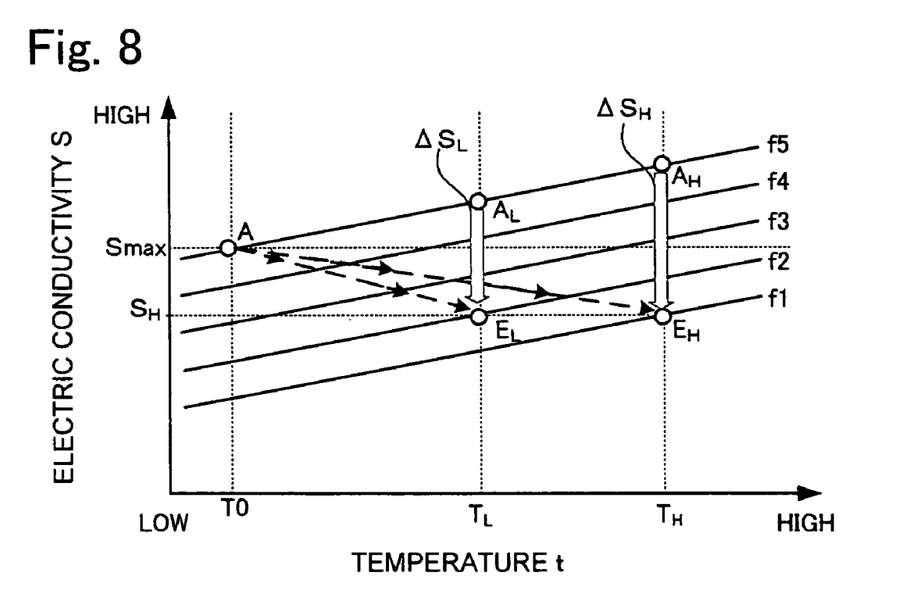
FIG. 8 is a control characteristic diagram of the liquid coolant temperature and electric conductivity in the control which decreases the electric conductivity.

For example, as shown in FIG. 8, with such active control of the decrease in electric conductivity, the control scan be conducted such that further decreases the electric conductivity after the warm-up with respect to the electric conductivity during the start by increasing the capacity of the ion exchanger 19, that is, the capability of decreasing the electric conductivity.

The cooling device is merely an example, a variety of cooling methods with liquid coolants can be considered, and the above-described embodiments are not limiting.

Furthermore, the present invention can be implemented not only during the warm-up of the fuel cell system. For example, the control maintaining the electric conductivity may be also conducted by estimating the increase in temperature of the fuel cell based on load power request from a load device (for example, a drive motor for a vehicle or auxiliary device for a fuel cell) to which the fuel cell supplies power during the operation of the fuel cell system.

Furthermore, in the above-described embodiments, the increase in temperature was estimated, but such embodiments are not limiting. For example, when the temperature of the fuel cell or the temperature of the liquid coolant (coolant) is directly or indirectly detected with a temperature sensor and this temperature exceeds the upper limit temperature of the electric conductivity corresponding to the target electric conductivity range, then the temperature control of the liquid coolant or the operation state of the fuel cell may be changed (feedback control). In this case, the upper limit temperature of electric conductivity may be set in advance by taking into account the margin that can be sufficiently allowed for the inherent electric conductivity limit.

With the present invention, the electric conductivity can be reliably maintained within a target range based on the correlation between the parameters relating to the coolant temperature and the electric conductivity of the coolant. Therefore, the invention can be generally employed in power cell systems where the increase in electric conductivity can cause problems. Such fuel cell system can be installed on land vehicles such as automobiles, sea vehicles such as ships, underwater vehicles such as submarines, and air vehicles such as aircrafts, or on stationary installations such as power generation plants.

We claim:

1. A device for cooling a fuel cell that adjusts a temperature of the fuel cell to a target set temperature by supplying a coolant, comprising:
   an electric conductivity sensor that measures an electric conductivity of the coolant;
   a temperature sensor that measures a temperature of the coolant; and
   a control unit that stores a correlation between the temperature and the electric conductivity of the coolant,
   the control unit being programmed to
      estimate an electric conductivity at the target set temperature based on the electric conductivity of the coolant, the temperature of the coolant, and the correlation between the temperature and the conductivity of the coolant, and
      based on a correlation between a parameter related to the temperature of the coolant and the electric conductivity of the coolant, when the electric conductivity at the target set temperature exceeds a target electric conductivity range, the control unit being programmed to control the parameter related to the temperature of the coolant so as to maintain the electric conductivity at the target set temperature within the target electric conductivity range.

2. The device for cooling a fuel cell according to claim 1, wherein the parameter related to the temperature of the coolant is at least one element selected from the group including the temperature of the coolant, a cooling degree of the coolant, a required output of the fuel cell, an operation state of the fuel cell, and an external air temperature.

3. The device for cooling a fuel cell according to claim 1, wherein the temperature of the coolant is controlled by changing at least one of the cooling degree of the coolant and the operation state of the fuel cell.

4. The device for cooling a fuel cell according to claim 1, further comprising an electric conductivity decreasing device that decreases the electric conductivity of the coolant, wherein
the parameter related to the temperature of the coolant is controlled based on the decrease quantity of the electric conductivity with the electric conductivity decreasing device.

5. The device for cooling a fuel cell according to claim 1, wherein the device decreases the target set temperature when the electric conductivity at the target set temperature exceeds the target electric conductivity range.

6. The device for cooling a fuel cell according to claim 5, wherein the device increases the target set temperature within a range in which the electric conductivity at the target set temperature does not exceed the target electric conductivity range.

7. A method for cooling a fuel cell by which a temperature of the fuel cell is adjusted to a target set temperature by supplying a coolant, the method comprising the steps of:
measuring an electric conductivity of the coolant;
measuring a temperature of the coolant;
storing a correlation between the temperature and the electric conductivity of the coolant;
estimating the electric conductivity at the target set temperature based on the electric conductivity of the coolant, the temperature of the coolant, and the stored correlation between the temperature and electric conductivity of the coolant;
controlling a parameter related to the temperature of the coolant and the electric conductivity of the coolant when the electric conductivity at the target set temperature exceeds a target electric conductivity range, so as to maintain the electric conductivity at the target set temperature within the target electric conductivity range; and
decreasing the target set temperature when the electric conductivity at the target set temperature exceeds the target electric conductivity range, wherein a control unit is programmed to perform at least the steps of estimating and controlling.

8. The method for cooling a fuel cell according to claim 7, further comprising a step of increasing the target set temperature within a range in which the electric conductivity at the target set temperature does not exceed the target electric conductivity range.

9. The device for cooling a fuel cell according to claim 2, wherein the temperature of the coolant is controlled by changing at least one of the cooling degree of the coolant and the operation state of the fuel cell.

10. The device for cooling a fuel cell according to claim 2, further comprising an electric conductivity decreasing device that decreases the electric conductivity of the coolant, wherein
the parameter related to the temperature of the coolant is controlled based on the decrease quantity of the electric conductivity with the electric conductivity decreasing device.

11. The device for cooling a fuel cell according to claim 3, further comprising an electric conductivity decreasing device that decreases the electric conductivity of the coolant, wherein
the parameter related to the temperature of the coolant is controlled based on the decrease quantity of the electric conductivity with the electric conductivity decreasing device.

12. The device for cooling a fuel cell according to claim 9, further comprising an electric conductivity decreasing device that decreases the electric conductivity of the coolant, wherein
the parameter related to the temperature of the coolant is controlled based on the decrease quantity of the electric conductivity with the electric conductivity decreasing device.

13. A device for cooling a fuel cell that adjusts a temperature of the fuel cell to a target set temperature by supplying a coolant, comprising:
a control unit, the control unit including a processor and a non-transitory computer-readable storage medium, the non-transitory computer-readable storage medium storing:
a correlation between a temperature of the coolant and an electric conductivity of the coolant; and
instructions for causing the processor to execute processing that:
estimates an electric conductivity at the target set temperature based on the electric conductivity of the coolant, the temperature of the coolant, and the correlation between the temperature and electric conductivity of the coolant; and
instructs the control unit to control a parameter related to the temperature of the coolant so as to maintain the electric conductivity at the target set temperature within a target electric conductivity range, when the electric conductivity at the target set temperature exceeds the target electric conductivity range based on a correlation between the parameter related to the temperature of the coolant and the electric conductivity of the coolant.

* * * * *